US008024118B2

(12) United States Patent
Bradley et al.

(10) Patent No.: US 8,024,118 B2
(45) Date of Patent: Sep. 20, 2011

(54) ENGINE IDLE CONTROL USING GPS TELEMATICS

(75) Inventors: James C. Bradley, New Haven, IN (US); Rodney J. Klinger, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 587 days.

(21) Appl. No.: 12/211,137

(22) Filed: Sep. 16, 2008

(65) Prior Publication Data

US 2010/0070153 A1    Mar. 18, 2010

(51) Int. Cl.
*G01C 21/00* (2006.01)
(52) U.S. Cl. ...................................................... 701/213
(58) Field of Classification Search .................. 701/36, 701/99, 103, 112, 207, 213, 300
See application file for complete search history.

(56) References Cited

U.S. PATENT DOCUMENTS

| 6,356,822 | B1 | 3/2002 | Diaz et al. |
| 6,426,694 | B1 | 7/2002 | Larson |
| 6,427,101 | B1 | 7/2002 | Diaz et al. |
| 6,430,486 | B1 | 8/2002 | Diaz et al. |
| 6,539,296 | B2 | 3/2003 | Diaz et al. |
| 6,571,168 | B1 * | 5/2003 | Murphy et al. ............... 701/123 |
| 6,950,740 | B1 | 9/2005 | Cook |
| 7,349,797 | B2 | 3/2008 | Donnelly |
| 2008/0258890 | A1 * | 10/2008 | Follmer et al. ............... 340/439 |

* cited by examiner

*Primary Examiner* — Kim T Nguyen
(74) *Attorney, Agent, or Firm* — Jeffrey P. Calfa; Mark C. Bach

(57) ABSTRACT

A vehicle reporting its position, typically derived from a global positioning or other navigation system, implements idle time limitation protocols based on its position. The particular protocol can be derived from a central, updated location using a telematics link.

8 Claims, 2 Drawing Sheets

ENGINE IDLE CONTROL USING GPS TELEMATICS

BACKGROUND OF THE INVENTION

1. Technical Field

The invention relates to geofencing for vehicles, and more particularly, to providing adaptive vehicle responses to differing jurisdictional requirements relating to vehicle operations, and still more particularly to limiting engine idle operation on commercial vehicles based on local/territorial regulatory regimes.

2. Description of the Problem

A geofence may be defined in part as a virtual spatial boundary. Geofences are a byproduct of the marriage of mobile, inexpensive telecommunications platforms and data processing systems. While not dependent upon global positioning systems in theory, their accuracy is greatly enhanced by making use of global positioning systems to provide accurate and precise determination of the location of the mobile platform. A geofence is manifested in programmed responses of a data processing system installed on the mobile platform responsive to changes in the platform's position. Typically the positions which produce a given set of responses define a contiguous region. The edges of the region become a virtual boundary or geofence. The spatial location of a geofence, that is the limits of region, have commonly been established by selecting a point feature, which may be a point defined by latitude and longitude, and then defining either a radius, or lengths for the major and minor axes through the point, to establish a boundary around the point. Geofences may also be constructed to conform to jurisdictional and other arbitrary boundaries.

Another development of significance to vehicle fleet management has been telematics, which may be realized in satellite enabled operational data uplinking from vehicles to remote servers and downloading of management and routing relating data from the remote server to the vehicles.

Beginning Jan. 1, 2008, the State of California limits idling of primary engines for commercial vehicles to no longer than 5 minutes. It would be advantageous if such a system operated automatically, and provided responses that alerted the driver/operator of the situation. Commercial operators can anticipate other jurisdictions will enact similar restrictions.

SUMMARY OF THE INVENTION

Provided is a system and method for establishing adaptive vehicle response to a geofence conforming to a jurisdictional boundary. More particularly, a vehicle reporting its position, typically derived from a global positioning or other navigation system implements idle time limitation protocols based on its position. The particular protocol can be derived from a central, updated location using a telematics link.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
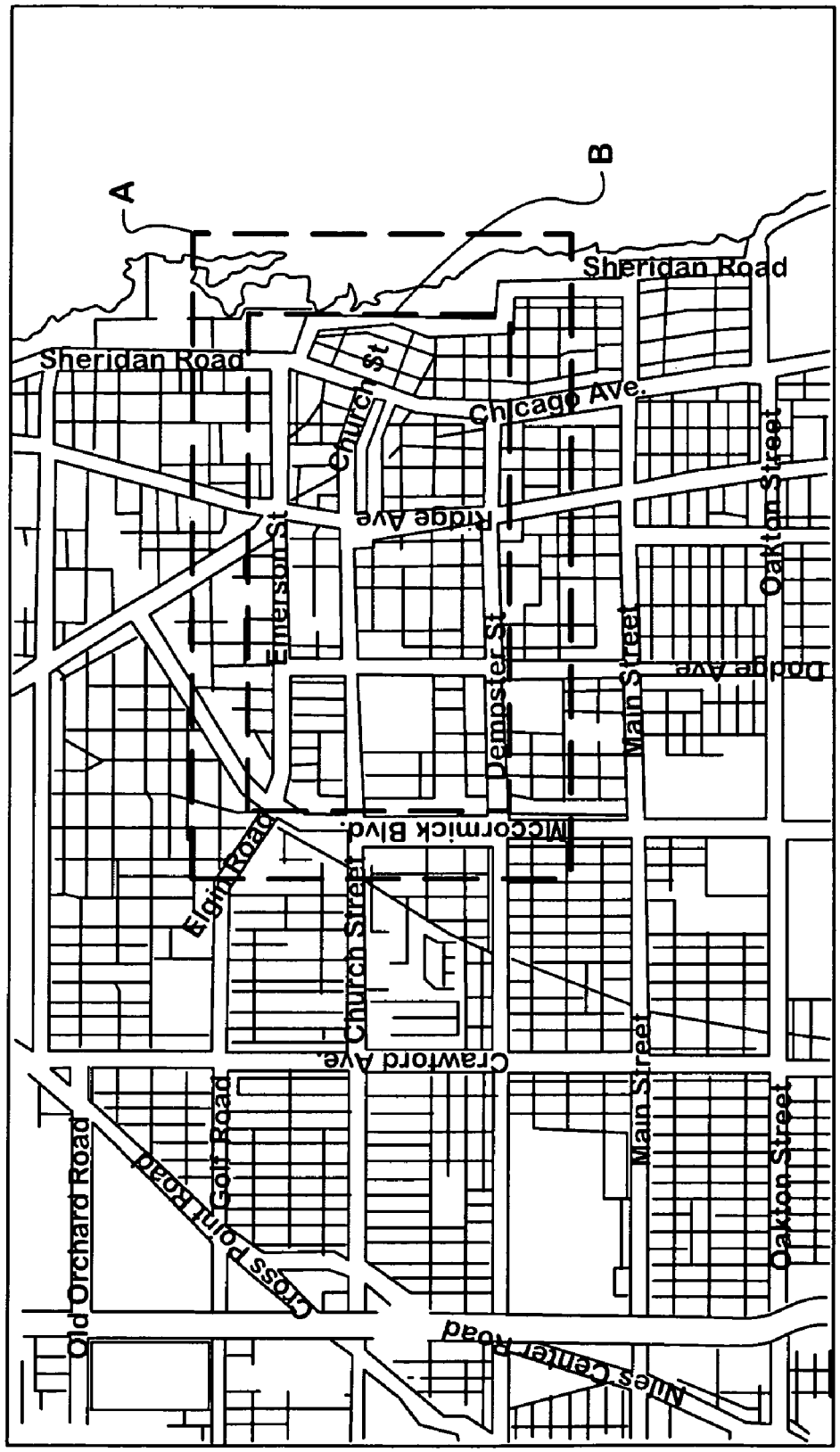
FIG. 1 is a map of a geographic region on which a geofence may be raised.

Referring now to FIG. 1, a geographic region includes subdivisions or jurisdictions A and B, wherein vehicle operating regulations differ. Vehicles traveling into and out of jurisdictions A and B are subject to regulations, such as idle time limitations, not applicable outside of the regions. An example of such a restriction would be the California Idle Regulations. Regions A and B may be arbitrarily shaped and a vehicle's position relative thereto established using a Global Positioning System to erect a geofence which conforms to the jurisdictional boundaries of the territory enacting the regulations or over which the regulations apply.

Figure 2:
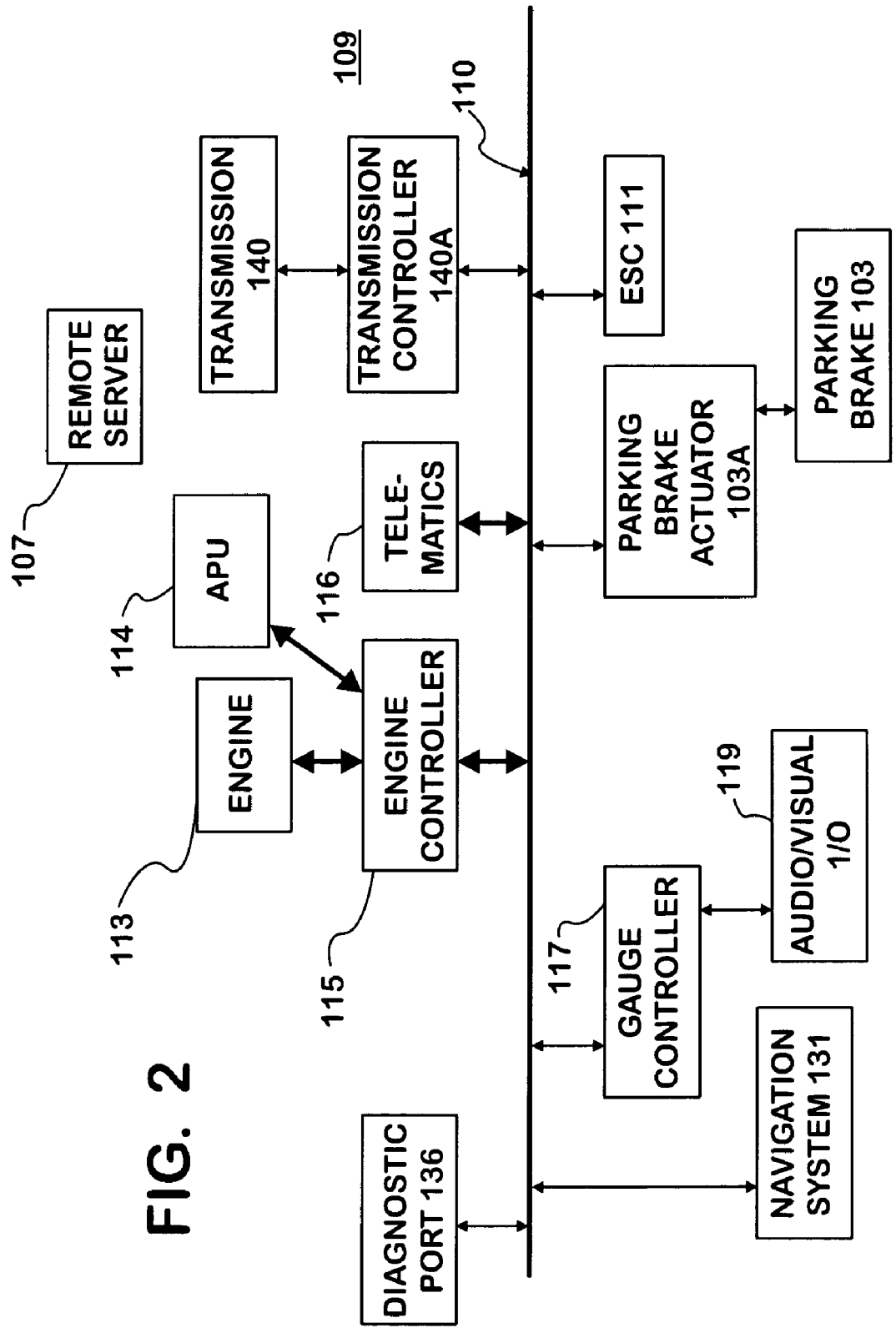
FIG. 2 is a block diagram schematic of a control system for a mobile platform which enables implementation of the staggered or tiered geofences of the present invention.

Referring to FIG. 2, a block diagram schematic of a control system 109 for a vehicle illustrates systems used to implement the invention at an operational, physical level. Control system 109 includes an electrical system controller (ESC) 111, or equivalent, which may be taken to serve as a supervisory controller for the control system. Control system 109 further includes a plurality of relatively autonomous controllers or operators may include local data processing and programming and are typically supplied by the manufacturer of the controlled component. These controllers include the transmission controller 140A, the engine controller 115 and the gauge controller 117. There may also be generic, programmable controllers, which may be used to carry out operator defined tasks though they are not limited to such functions. The assignee of the present application markets generic controllers for controller area network applications, termed Remote Power Modules, which can be readily programmed from an external diagnostic port 136 or by the electrical system controller 111 in response to particular hardware attached to the remote power module.

The common data bus 110 is typically a serial data link 110 constructed as a twisted pair cable. It is typically externally accessible via a diagnostic port 136. Although the autonomous controllers handle many functions locally and may be capable of functioning without reference to ESC 111, they exchange data with ESC 111 and can receive operational direction from ESC 111 over the data bus 110. Bus 110 typically operates in accord with a protocol such as the Society of Automotive Engineers (SAE) J1939 protocol relating to controller area networks (CAN).

In an SAE J1939 compliant CAN, data buses may be private or public. A system topology will generally provide that the generic controllers are connected to a private bus and the dedicated controllers are connected to a distinct public bus. The ESC 111 is then connected to both buses and acts as a bridge between the buses. The general principal here is that generic controllers are typically used to provide customer specific functions, and use an customized communication set, which is not understandable by the dedicated controllers. This requires the ESC 111 to handle translation between the buses where a controller on one bus is required to respond to events being reported on the other bus and to allow data exchange between dedicated and generic controllers. The details of such a system are not relevant to the present invention and data bus 110 may be taken to be a conflation of public and private buses, if a private bus is used.

A geofence is manifested as preprogrammed responses of the vehicle control system occurring with changes in vehicle position. The programmed responses alter vehicle operation in a way not conforming to normal operation. However, a geofence does not mandate any specific response and accordingly a geofence, may be manifested as selected subsets of possible vehicle responses. In the preferred embodiment of the invention maximum engine idle time is set. In addition, responses such as activation of a vehicle auxiliary power unit 114 in case of engine 113 idle time limit being reached may be programmed. The engine controller 115 may be programmed to implement these responses. The vehicle may not include programming detailing requirements for all jurisdictions, but may access such information by reporting its position by a telematics unit 116 to a remote telematics server 107, which will download the requirements applicable to the vehicle based on its position. A navigation system 131 provides the geographic location of the vehicle 10. The navigation system is conventionally supplied by a Global Positioning System (GPS) device that takes an external input from a satellite such as the commercially available LORAN system. The navigation system 131 may alternatively be a dead reckoning system without an external input or a combination of an external system and an internal to the vehicle dead reckoning system from the speed sensing device and other sensed parameter measurement devices.

The ESC 111 may be programmed for warning an operator using the gauge controller 117 and audio/visual input/output devices 119 mounted in the vehicle cab. Upon crossing a first tier geofence ESC 111 can cause gauge controller 117 to issue an audio warning over an audio/visual input/output device 119 on the vehicle dash panel.

Those skilled in the art will now appreciate that alternative embodiments of the invention can exist. While the invention is shown in one of its forms, it is not thus limited but is susceptible to various changes and modifications without departing from the spirit and scope of the invention.

What is claimed is:

1. A method of implementing engine idle control for a primary engine for a vehicle with a control system for the vehicle, the method comprising the steps of:

using a navigation system to establish a geofence corresponding to territorial limits of a idle regulation regime;

using a telematics system to determine whether the vehicle is within the territorial limits of the idle regulation regime by reference to the geofence; and automatically implementing idle limitation responsive to location of the vehicle within the territorial limits.

2. A method in accordance with claim 1, wherein the idle regulation regime is maintained on remote server.

3. A method in accordance with claim 2, wherein the steps are implemented on a vehicle.

4. A method in accordance with claim 3, further comprising the step implemented on the vehicle of interrogating the remote server to obtain coordinates for the geofence.

5. A method in accordance with claim 1, wherein a remote server maintains records relating to a plurality of idle regulation regimes.

6. A method in accordance with claim 1, further comprising the step of starting an auxiliary power unit in response to limiting idling of the primary engine.

7. A control system for a motor vehicle comprising:

an engine controller for a primary engine for the motor vehicle;

a telematics unit coupled for communication with the engine controller for providing coordinates to a geofence corresponding to territorial limits of a idle regulation regime;

control system programming and navigation systems for determining whether the motor vehicle is within the territorial limits of the idle regulation regime by reference to the geofence; and the engine controller being responsive to the location of the vehicle within the idle regulation regime for automatically implementing idle limitation responsive to location of the vehicle.

8. The control system of claim 7, further comprising an auxiliary power unit under control of the engine controller.

* * * * *